H. S. MURRAY.
PORTABLE INSTANTANEOUS WATER HEATER.
APPLICATION FILED JULY 15, 1920.

1,357,891.

Patented Nov. 2, 1920.
2 SHEETS—SHEET 2.

INVENTOR.
Henry S. Murray.
BY J. Sargent Elliott.
ATTORNEY.

UNITED STATES PATENT OFFICE.

HENRY S. MURRAY, OF DENVER, COLORADO.

PORTABLE INSTANTANEOUS WATER-HEATER.

1,357,891.  Specification of Letters Patent.  Patented Nov. 2, 1920.

Application filed July 15, 1920. Serial No. 396,487.

*To all whom it may concern:*

Be it known that I, HENRY S. MURRAY, a citizen of the United States of America, residing at the city and county of Denver and State of Colorado, have invented new and useful Portable Instantaneous Water-Heaters, of which the following is a specification.

This invention relates to improvements in portable instantaneous water heaters.

The object of the invention is to provide, in a single structure, a heater which is adapted to be connected with the usual electric lighting system of a house, and a reservoir supported thereon and arranged to distribute a supply of water in a thin sheet over the surface of said heater, the water being thereby instantaneously heated.

Further, to provide an electric heater having a dome-like inclosed heating surface, and a reservoir connected therewith, and arranged to supply water in small, continuous streams upon the highest point of said heating surface, whereby the water is instantaneously heated as it flows down over the said heating surface, a gutter being formed around the base of the heater, having an outlet, the heated water being collected in said gutter and discharged through said outlet.

Further, to provide an electric water heater having an attached reservoir in which the water supply forms a current conductor, the circuit through the heating element being automatically broken when the supply of water from the reservoir is exhausted.

Figure 1:
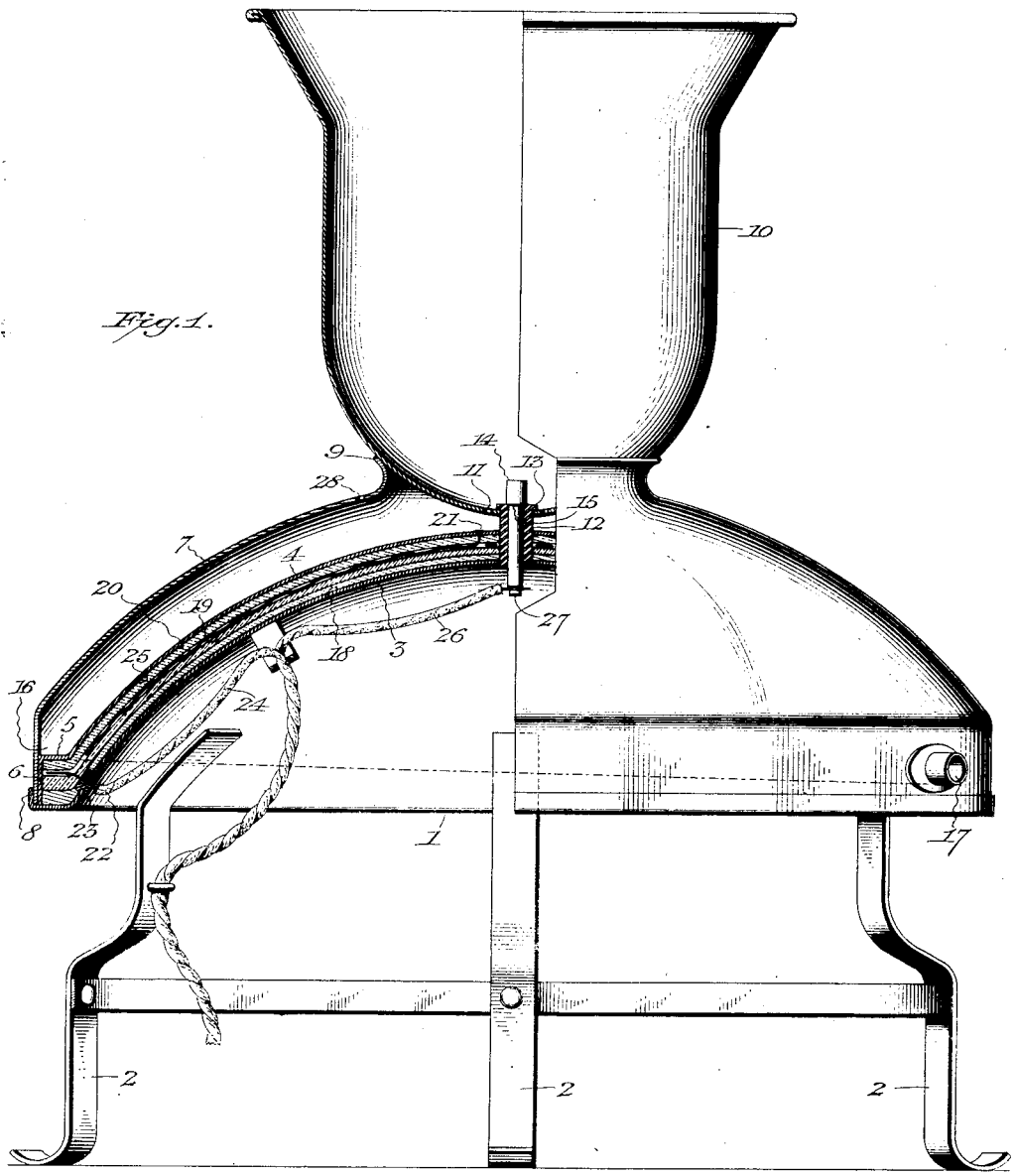
Figure 2:
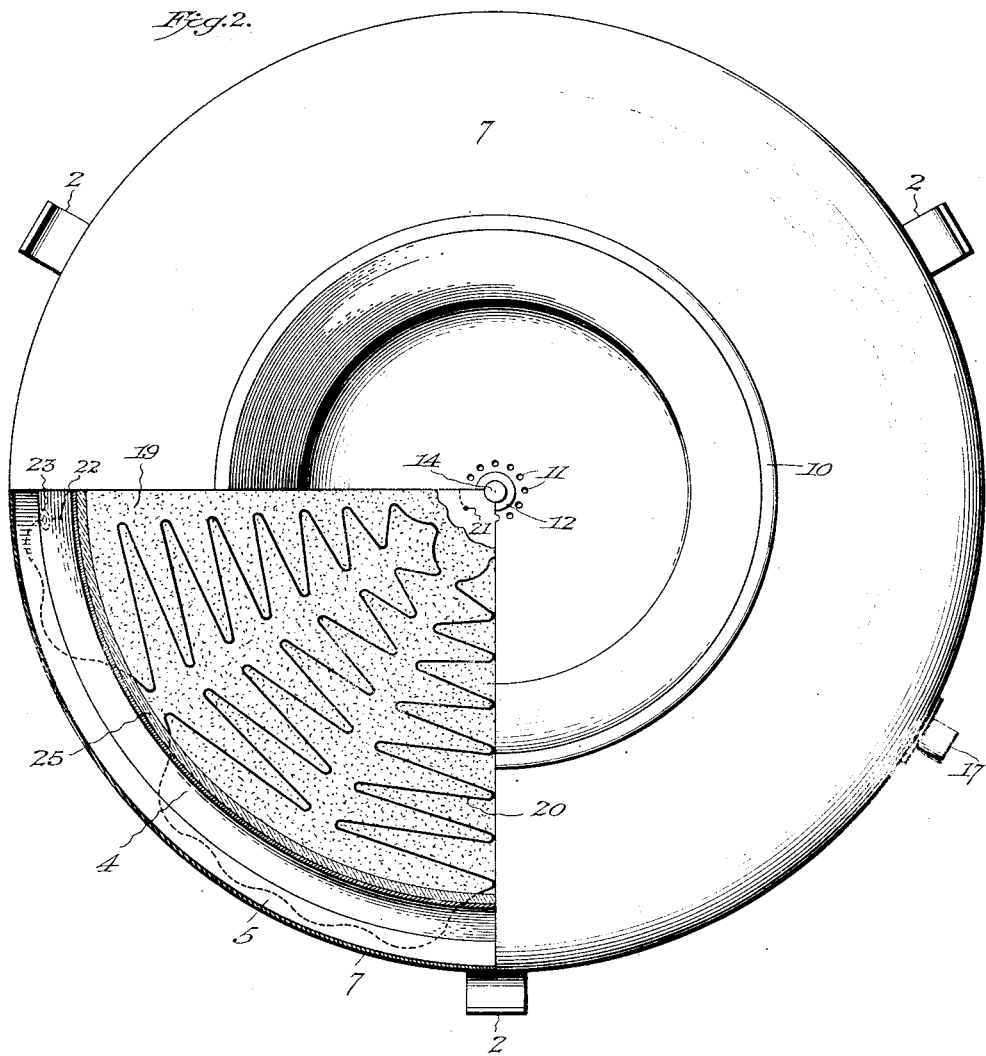

These objects are accomplished by the device illustrated in the accompanying drawings, in which:

Figure 1 is a view, partly in elevation and partly in section, illustrating the construction of the improved water heater. And Fig. 2 is a plan view thereof, partly in section.

Referring to the accompanying drawings:

The numeral 1, indicates the heater, which is in the form of a hollow metal dome-like casing, and which is supported on legs 2, which are preferably secured in any suitable manner to the inner wall 3, of the said casing. The outer wall 4, of the hollow casing constitutes the water heating surface, and this wall terminates in a horizontal base flange 5, which is bent upon itself to form a depending vertical annular rim 6. A jacket 7, incloses the wall 4, and this jacket is concentric with, and spaced from the said wall, and its base portion fits tightly around the annular rim 6, of the wall 4, and is secured thereto in any suitable manner by which a water tight, and at the same time, a heat resisting connection is effected. The base of the inner wall 3, of the casing terminates in an annular upturned lip 8, which is suitably secured to and around the base of the jacket, thus forming an additional means of uniting the jacket to the rim 6, of the heating wall 4, of the hollow casing.

The upper or highest portion of the jacket 7, has an axial circular opening, the margin of which is in the form of a flared rim 9, and supported within this flared rim and suitably secured thereto, is the semi-spherical lower end of a reservoir 10, of any desired capacity. The bottom of this reservoir is provided with a circular series of small perforations 11, and a circular plug 12, of suitable insulating material passes down through the axial center of the bottom of the reservoir, and through the two walls 3 and 4, of the hollow casing. The perforations 11, surround the upper end of the plug, which is provided with a flange 13, which rests upon the bottom of the reservoir, there being a water tight connection between the plug and the bottom of the reservoir. The plug 12, is provided with an axial hole in which is tightly fitted a conductor 14, in the form of a copper stem, which projects above and below the upper and lower ends of the plug, the portion of the conductor above the plug being of slightly greater diameter than the remaining portion, to form a shoulder 15, which rests upon the upper end of the plug. The base flange 5, forms, in connection with the surrounding base portion of the jacket, a gutter 16; and in order that the water collecting in the gutter may be quickly discharged therefrom the flange 5, which forms the bottom of the gutter, is in the form of a double inclined plane, which slopes in opposite directions from its highest point to a diametrically opposite point, where an outlet is formed through the jacket, in which is secured an outlet nipple 17.

The space between the two walls 3 and 4, of the hollow casing is filled with a suitable heat resisting material which incloses a heating element, and this material preferably comprises mica and asbestos, arranged in the following manner: Adjoining the inner wall 3, is placed a layer 18, of asbestos, which is so arranged as to completely cover the entire surface of the wall 3, and the asbestos layer is in turn completely covered by a layer 19, of mica. Upon the layer 19, of mica, is placed the heating element 20, which may be of any character suitable for the purpose intended, but which, as illustrated, is in the form of a tortuous bent wire, so arranged as to extend over the entire surface of the mica 19, one terminal 21, of the wire being grounded to the wall 4, while the other terminal 22, thereof, passes through an insulating plug 23, in the wall 3, and connects with a circuit wire 24. A second layer 25, of mica is placed over the heating element 20, this layer filling the space between the heating element and the outer wall 4. The layers of mica and asbestos are arranged to extend beneath the gutter, as is also the heating element, as will be understood by reference to the drawings.

One end of a circuit wire 26, is secured to the lower end of the conductor 14, by means of a binding screw 27, and the wires 24 and 26, are adapted to be connected to a plug of the usual form, not illustrated, by which the wires may be connected with the lighting system of a house, as will be understood.

The asbestos 18, tends to prevent excessive heating of the wall 3, and thus directs the heat outward through the heating wall 4, and the mica confines the heating element and prevents direct contact of the same with the wall 3. The jacket is provided with one or more vent holes 28, to relieve the pressure in the jacket.

In practice, the wires 24 and 26, which are connected to the usual form of plug, as before stated, are connected to a socket of the lighting system, and the current turned on, but the circuit through the heater remains open until the reservoir is filled with water, when the circuit through the heating element is immediately closed; the current passing through the wire 24 and heating element to the point 21, where it is grounded to the wall 4, and thence through the jacket and reservoir, both of which are metal, to the water in the reservoir, and the water conveys the current to the conductor 14, and thence back through the wire 26, to the power source, thus completing the circuit through the heating element. The water in the reservoir discharges slowly through the holes 11, and trickles down upon the highest point of the dome-like heating wall 4, and flows down its surface in all directions to the gutter 16, at the base of the wall, whence it is discharged through the nipple 17, into a receptacle. The quantity of water flowing over the surface of the wall is relatively small, and is therefore practically instantaneously heated, and by the time it reaches the gutter, its temperature is high enough for all practical purposes, and should the heat be sufficient to develop steam, the steam escapes through the vents 28, and thus relieves the pressure in the jacket.

When the water has all discharged from the reservoir, the current through the heating element is automatically broken, thus preventing overheating of the parts constituting the device.

Having described my invention, what I claim as new, and desire to secure by Letters Patent, is:

1. In a water heater of the character described, the combination with a hollow metal casing and a heating element therein, one terminal of which is grounded to said casing, of a metal reservoir supported above said casing and connected therewith and adapted to discharge water thereon, a conductor in said reservoir having a portion extending through the same and through said casing and insulated from both, and circuit wires connected to said conductor and the other terminal of said heating element, and adapted to be connected with a current source, the water in the reservoir acting as a current conveyer between the same and said conductor.

2. In a water heater of the character described, the combination with a hollow metal casing, a jacket inclosing the same and spaced therefrom, a metal water reservoir supported in said casing, having perforations for discharging water upon said casing, and a conductor in said reservoir having a portion extending therethrough and through said casing and insulated from both; of a heating element in said hollow casing, one terminal of which is grounded thereto, the other terminal extending out through said casing, and being insulated therefrom, circuit wires adapted to be connected with a current source, one of which connects with said latter terminal, while the other is connected with the said conductor, the water in the reservoir acting as a current conveyer between the same and said conductor, and water outlet in said jacket.

3. In an electric water heater of the character described, the combination with a hollow dome-like casing, a jacket surrounding the same and spaced therefrom, a reservoir supported in the jacket and having perforations for discharging water upon said casing and a conductor in said reservoir having a portion which extends through the same and said hollow casing and insulated from both; of a heating element in said hollow casing, one terminal of which is grounded to said casing, the other terminal passing out through the casing and insulated therefrom, circuit wires adapted to be connected with a current source, one of which connects with said latter terminal while the other connects with said conductor, the water in the reservoir acting as a current conveyer between the same and said conductor, and a water outlet in said jacket.

4. In an electric water heater of the character described, a hollow dome-like casing, a heat-resisting element therein, a heating element inclosed in said heat insulating element, one terminal of which is grounded to said casing while the other terminal extends out through the casing and is insulated therefrom, a jacket surrounding the hood casing and spaced therefrom, an annular gutter being formed at the junction of said jacket and outer wall of said casing, a reservoir supported in said jacket having perforations for discharging water upon said casing, a conductor in said reservoir having a portion which extends down through the same and through said hollow casing and insulated from both, circuit wires adapted to be connected with a current source, one of which connects with said conductor, while the other connects with the free terminal of the heating element, the water in the reservoir acting as a current conveyer between the same and the conductor, and an outlet from said gutter through said jacket.

5. In a water heater of the character described, a hollow dome-like casing having a flange around its base portion which inclines downward in both directions from one point to a diametrically opposite point, a jacket inclosing and spaced from said casing and secured around said flange, thereby forming a gutter, a reservoir having a semi-spherical perforated bottom which extends through an opening in said jacket and is secured to the marginal edge of said opening, a conductor having a portion extending through the bottom of said jacket and through said hollow casing and insulated from both, a heating element in said hollow casing in the form of a tortuous bent wire, one terminal of which is grounded to said casing, the other terminal extending through said casing and insulated therefrom, a circuit wire connected to the lower end of said conductor, said wires being adapted to be connected with an electric current source, and an outlet through said jacket from the lower point of said gutter, the water in the reservoir acting as a current conveyer between the same and the said conductor.

In testimony whereof I affix my signature in presence of two witnesses.

HENRY S. MURRAY.

Witnesses:
JOHN W. ELLIOTT,
WILLIAM F. SPALDING.